(12) United States Patent
Okada

(10) Patent No.: US 11,504,839 B2
(45) Date of Patent: Nov. 22, 2022

(54) ELECTRIC TOOL

(71) Applicant: KYOCERA INDUSTRIAL TOOLS CORPORATION, Hiroshima (JP)

(72) Inventor: Atsuhito Okada, Hiroshima (JP)

(73) Assignee: KYOCERA INDUSTRIAL TOOLS CORPORATION, Hiroshima (JP)

( * ) Notice: Subject to any disclaimer, the term of this patent is extended or adjusted under 35 U.S.C. 154(b) by 115 days.

(21) Appl. No.: 17/263,155

(22) PCT Filed: Jul. 24, 2019

(86) PCT No.: PCT/JP2019/028935
§ 371 (c)(1),
(2) Date: Jan. 26, 2021

(87) PCT Pub. No.: WO2020/022358
PCT Pub. Date: Jan. 30, 2020

(65) Prior Publication Data
US 2021/0162512 A1 Jun. 3, 2021

(30) Foreign Application Priority Data
Jul. 27, 2018 (JP) .............................. JP2018-140890

(51) Int. Cl.
*B23B 31/19* (2006.01)
*B24B 23/02* (2006.01)
(Continued)

(52) U.S. Cl.
CPC ................ *B25F 5/00* (2013.01); *B23B 31/19* (2013.01); *B25F 3/00* (2013.01); *B23B 31/1612* (2013.01); *B23D 61/006* (2013.01); *B24B 23/022* (2013.01)

(58) Field of Classification Search
CPC ....... B23B 31/10; B23B 31/19; B23B 45/006; B23D 61/006; B24B 23/02; B24B 23/022;
(Continued)

(56) References Cited

U.S. PATENT DOCUMENTS 9,339,904 B2 * 5/2016 Emi .......................... B27B 5/32
9,486,934 B2 * 11/2016 Zhou ........................ B23Q 3/14
(Continued)

FOREIGN PATENT DOCUMENTS

DE 102005047400 B3 * 12/2006 ............. B24B 23/02
JP 2012232382 A 11/2012
(Continued)

OTHER PUBLICATIONS

International Search Report in PCT Application No. PCT/JP2019/028935, dated Oct. 29, 2019, 3pp.

*Primary Examiner* — Chwen-Wei Su
(74) *Attorney, Agent, or Firm* — Hauptman Ham, LLP

(57) ABSTRACT

Included are: a clamp configured to switch between a mounting state in which a tip tool is mounted and a releasing state in which the tip tool is removed; a clamp moving portion configured to move between a first position at which the clamp is in the mounting state and a second position at which the clamp is in the releasing state; a clamp urging portion configured to urge the clamp moving portion to the first position; a case accommodating at least a part of each of the clamp, the clamp moving portion, and the clamp urging portion; a retaining portion configured to retain the clamp moving portion at the second position; and a mounting operation portion configured to receive mounting operation for switching the clamp from the releasing state to the mounting state. When the mounting operation portion receives the mounting operation, the retaining portion can-
(Continued)

cels retaining of the clamp moving portion at the second position.

6 Claims, 23 Drawing Sheets

(51) Int. Cl.
*B25F 5/00* (2006.01)
*B25F 3/00* (2006.01)
B23B 31/171 (2006.01)
B23D 61/00 (2006.01)

(58) Field of Classification Search
CPC ......... B24B 23/04; B27B 19/006; B27B 5/30; B27B 5/32; Y10T 279/33; B25F 3/00; B25F 5/00

See application file for complete search history.

(56) References Cited

U.S. PATENT DOCUMENTS

2016/0221175 A1 8/2016 Aoki
2017/0291277 A1* 10/2017 Gao ........................ B24B 23/04

FOREIGN PATENT DOCUMENTS

| JP | 5718207 B2 | 5/2015 |
| JP | 2016144862 A | 8/2016 |

* cited by examiner

ELECTRIC TOOL

CROSS-REFERENCE TO RELATED APPLICATIONS

The present application is a National Phase of International Application No. PCT/JP2019/028935, filed Jul. 24, 2019, and claims priority based on Japanese Patent Application 2018-140890, filed Jul. 27, 2018 the disclosure of which is incorporated herein by reference.

TECHNICAL FIELD

The present invention relates to an electric tool including a mountable and removable tip tool.

BACKGROUND ART

An electric tool (also referred to as "multi-tool") including a mountable and removable tip tool is described in, for example, JP 2012-232382 A. In the configuration described in this document, an engaging member moves between a retaining position and a releasing position. The engaging member is engaged with the tip tool at the retaining position. Further, the engaging member is urged by a spring and is retained at the retaining position.

CITATION LIST

Patent Document

Patent Document 1: JP 2012-232382 A

SUMMARY

Technical Problem

However, the engaging member is not retained at the releasing position. Thus, a user is required to keep pressing down a knob for operating the engaging member and retain the engaging member at the releasing position. Thus, there is a problem in manageability at the time of mounting the tip tool, for example.

The invention of the present application has an object to provide an electric tool with good manageability including a tip tool that is easily attachable and removable.

Solution to Problem

An electric tool according to the present invention includes: a clamp configured to switch between a mounting state in which a tip tool is mounted and a releasing state in which the tip tool is removed; a clamp moving portion configured to move between a first position at which the clamp is in the mounting state and a second position at which the clamp is in the releasing state; a clamp urging portion configured to urge the clamp moving portion to the first position; a case accommodating at least a part of each of the clamp, the clamp moving portion, and the clamp urging portion; a retaining portion configured to retain the clamp moving portion at the second position; and a mounting operation portion configured to receive mounting operation for switching the clamp from the releasing state to the mounting state, wherein when the mounting operation portion receives the mounting operation, the retaining portion cancels retaining of the clamp moving portion at the second position.

Further, the clamp moving portion may include a shaft portion that is connected to the clamp and moves between the first position and the second position, the retaining portion may include an engaging portion that moves to approach or separate from a shaft center of the shaft portion, and the shaft portion may include a recessed portion in a side surface, the recessed portion being engaged with the engaging portion when the clamp moving portion is at the second position.

Further, the clamp moving portion may include a shaft portion that is connected to the clamp and moves between the first position and the second position, the shaft portion may include one end portion and an other end portion, and the one end portion is connected to the clamp, the retaining portion may include a cam, the cam may include a cam surface configured to move the shaft portion by turning while abutting on the other end portion of the shaft portion, the cam surface may include a distal portion far from the clamp and a proximal portion close to the clamp, and the clamp moving portion may be at the first position when the distal portion of the cam abuts on the other end portion of the shaft portion, and the clamp moving portion may be at the second position when the proximal portion of the cam abuts on the other end portion of the shaft portion.

Further, the clamp may be positioned on a bottom surface side of the case, and the mounting operation portion may be positioned on a side surface side of the case.

Further, included is a releasing operation portion configured to receive releasing operation for switching the clamp from the mounting state to the releasing state. At least a part of the releasing operation portion may be exposed from the case, and the clamp moving portion may move from the first position to the second position when releasing operation is received in a direction different from that in the mounting operation of the mounting operation portion.

Further, when the releasing operation portion receives releasing operation of turning from a surface of the case, the clamp moving portion may move from the first position to the second position, and the mounting operation portion may move in a direction of being pushed into the case along with the mounting operation.

DESCRIPTION OF EMBODIMENTS

Now, with reference to the drawings, an electric tool according to the present invention is described by giving a first embodiment to a fifth embodiment as examples. Note that, in the following direction expressions, a flat surface side indicates an upper side in FIG. 1 or the like, and a bottom surface side indicates a lower side in FIG. 1 or the like. Note that, in the following, description is also given in a vertical direction in a state illustrated in FIG. 1. Moreover, one of a base end side and a rear side corresponds to a left side in FIG. 1 or the like, and one of a tip side and a front side corresponds to a right side in FIG. 1 or the like. Further, configurations having common actions are illustrated with common reference symbols even when forms are different. Further, description for configurations overlapping in a prior embodiment and a posterior embodiment is omitted in some cases.

First Embodiment

Figure 1:
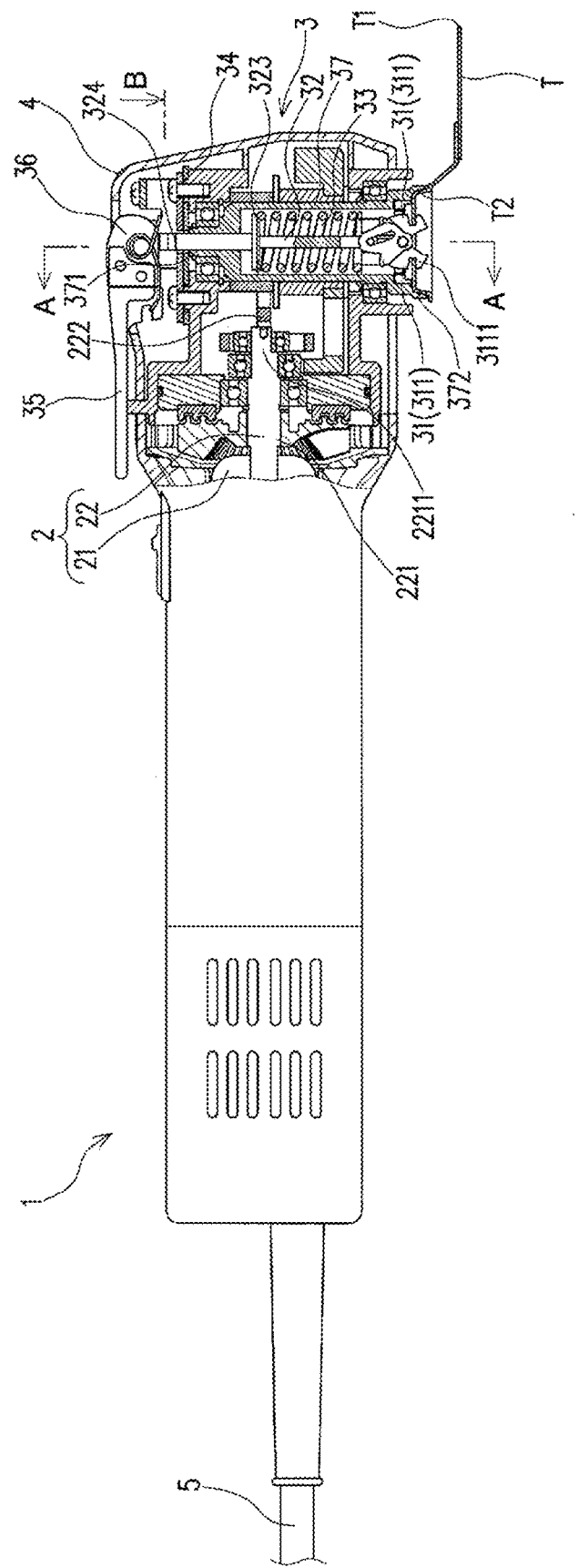
FIG. 1 is a side view illustrating an electric tool according to a first embodiment of the present invention when a tip portion is viewed in a vertical cross-section in a front-and-rear direction.
Figure 2:
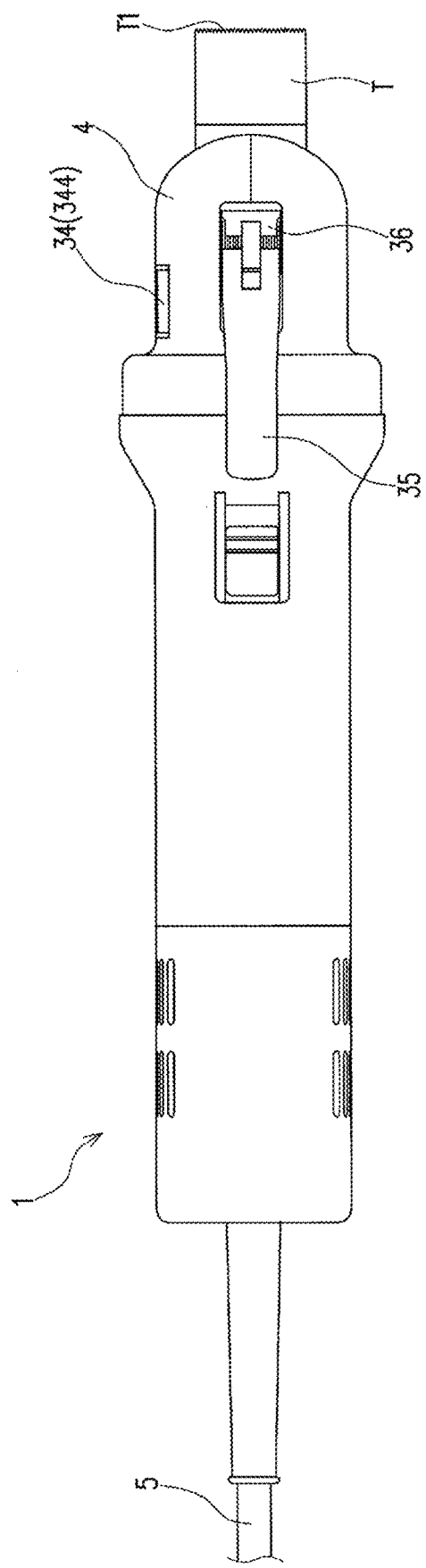
FIG. 2 is a plan view illustrating the electric tool.

An electric tool 1 according to the present embodiment is illustrated in FIG. 1 and FIG. 2. The electric tool 1 is a vibrating tool. A tip tool T mounted to a tip portion of a body of the electric tool 1 is vibrated at high speed. With this, an object to be processed can be subjected to cutting, finishing, or the like. As illustrated in, for example, FIG. 2, examples of the tip tool T include a plate-shaped cutter obtained by forming a saw blade at a tip edge portion T1. However, the form of the tip tool T is not limited thereto. The electric tool 1 mainly includes a driving unit 2 and a tip tool mounting mechanism 3. The driving unit 2 includes a motor 21 that generates a driving force and a transmission mechanism 22 that transmits the driving force to the tip tool T. A known mechanism may be employed as the driving unit 2. The tip tool mounting mechanism 3 is configured to mount and remove the tip tool T and retains the mounted tip tool T.

The transmission mechanism 22 includes a driving shaft 221. The driving shaft 221 is rotated in the circumferential direction by the motor 21 positioned on the base end side. At a tip portion of the driving shaft 221, an eccentric portion 2211 that is eccentric with respect to a rotation center at the time of rotation is formed. A swinging portion 222 is connected to the eccentric portion 2211 on the tip side. The swinging portion 222 is coupled to the tip tool mounting mechanism 3 (specifically, a cylindrical portion 37 thereof). With this, the motor 21 is rotated, and hence the swinging portion 222 swings. Thus, the tip tool T that is mounted to the tip tool mounting mechanism 3 through intermediation of the cylindrical portion 37 can be vibrated.

The electric tool 1 includes a case 4 being an exterior. At the time of using the electric tool 1, for example, a user grasps the case 4 in a range from a base end part to an intermediate part thereof. A power cord 5 for connection with an external power source extends from a base end of the case 4. However, the configuration is not limited thereto. The electric tool 1 may be equipped with a battery and may not require connection with an external power source.

The tip tool mounting mechanism 3 mainly includes: a clamp 31, a clamp moving portion (shaft portion 32), a clamp urging portion 33, a retaining portion (part of lock plate 34), a mounting operation portion (part 344 of the lock plate 34), a releasing operation portion (lever 35), a cam 36, and the cylindrical portion 37. A part of the clamp 31, the shaft portion 32, the clamp urging portion 33, and the retaining portion (part of the lock plate 34) are accommodated in the case 4 (particularly, in at least a part of the case 4 on the tip side in the electric tool 1). The mounting operation portion (part of the lock plate 34), the lever 35, and the cylindrical portion 37 partially protrude from the case 4 and hence are exposed from the case 4.

The cylindrical portion 37 is a part having a substantially cylindrical shape and extending in the vertical direction and accommodates: the clamp 31, a part of the shaft portion 32 being the clamp moving portion, and the clamp urging portion 33. An upper portion 371 of the cylindrical portion 37 supports the shaft portion 32 movably in a longitudinal direction (vertical direction) with respect to the cylindrical portion 37. Thus, at least a range of the shaft portion 32, which moves with respect to the upper portion 371, has a constant horizontal cross-section shape. Further, a bottom end portion 372 of the cylindrical portion 37 abuts on the tip tool T mounted to the clamp 31. More specifically, as illustrated in FIG. 1, a base end portion T2 of the tip tool T is fit into the bottom end portion 372 of the cylindrical portion 37. With this, the tip tool T is stably supported by both the clamp 31 and the cylindrical portion 37.

Figure 3A:
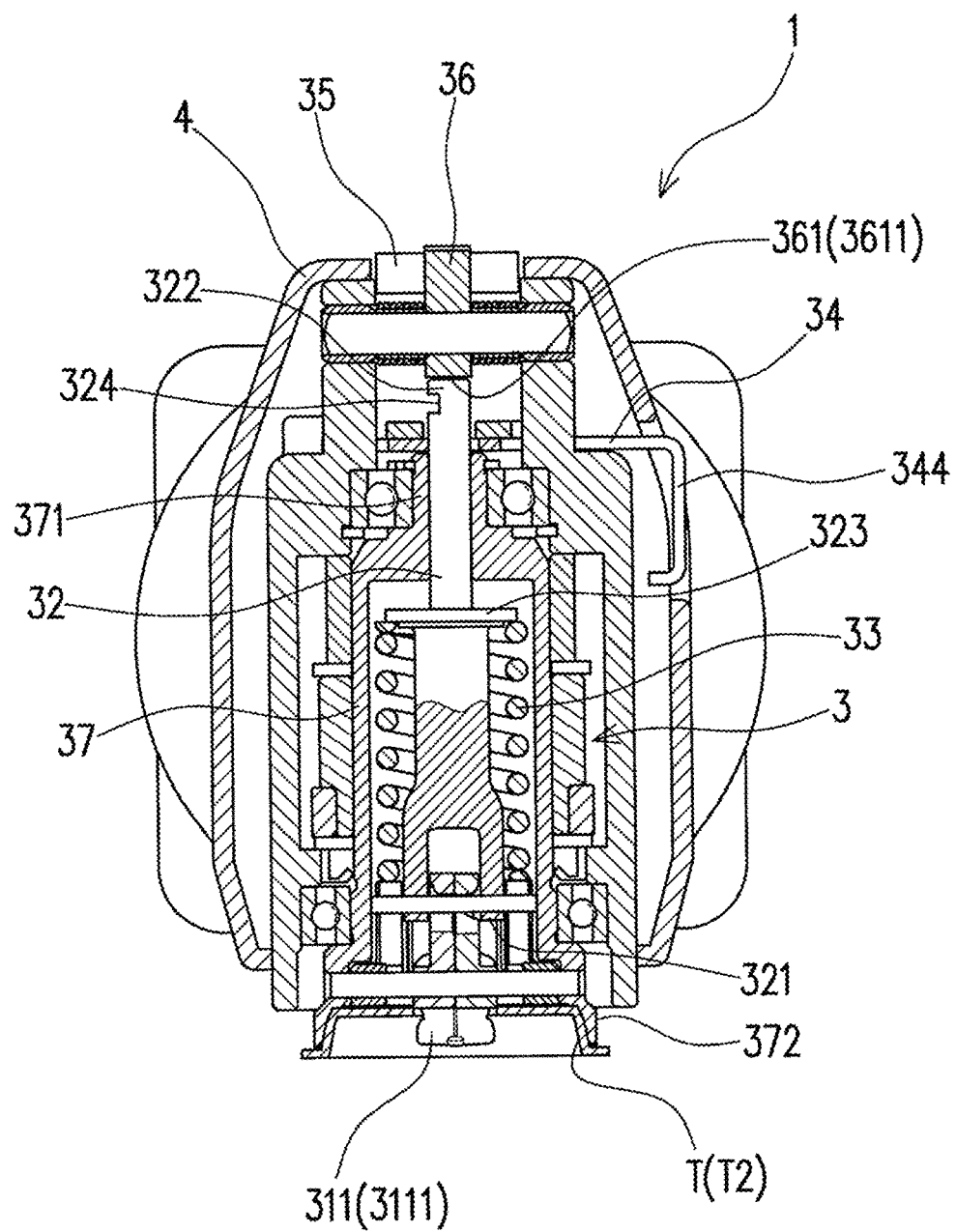
FIG. 3A is a vertical cross-sectional view illustrating the electric tool, which is taken along the line A-A in FIG. 1, and illustrating a mounting state of a clamp.
Figure 12A:
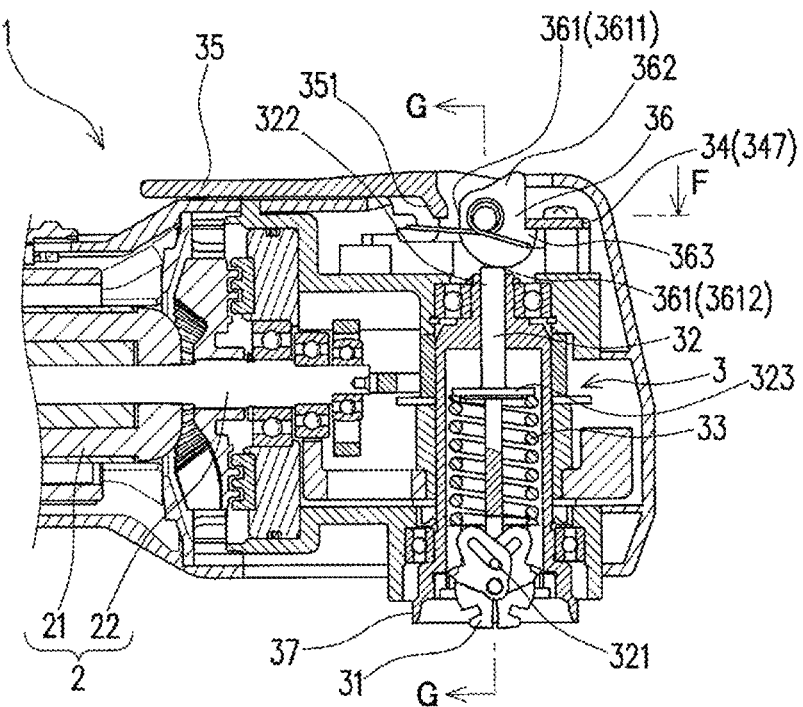
FIG. 12A is a vertical cross-sectional view in the front-and-rear direction, illustrating the tip portion of the electric tool (releasing state).

The clamp 31 performs switching between a mounting state of mounting the tip tool T and a releasing state of removing the tip tool T. The mounting state is a state illustrated in FIG. 1 and FIG. 3A. The releasing state is a state illustrated in FIG. 3B. Note that, in the present embodiment, the releasing state of the clamp 31 is not illustrated in a vertical cross-sectional view as in FIG. 1. However, it is an identical state to that of the clamp 31 of a fourth embodiment, which is illustrated in FIG. 12A.

The clamp 31 is positioned on a bottom surface side of the case 4. Further, the clamp 31 includes a pair of engaging pieces 311 and 311 that are engaged with the tip tool T. A basic configuration of the clamp 31 is known (see, for example, JP 2016-529119 T). Although not described in detail, a clamp claw portion 3111 of each of the pair of engaging pieces 311 and 311, which is a part engaging with the tip tool T, is engaged with the tip tool T by mutually spreading in the mounting state (see FIG. 1) and releases engagement with the tip tool T by mutually contracting in the releasing state (see FIG. 12A in the fourth embodiment). The pair of engaging pieces 311 and 311 mutually spread in a state in which the shaft portion 32 rises and mutually contract in a state in which the shaft portion 32 is lowered. Note that, unlike the present embodiment, each of the clamp claw portions 3111 may be engaged with the tip tool T by mutually contracting in the mounting state and may release engagement with the tip tool T by mutually spreading in the releasing state.

The clamp moving portion moves between a first position (see FIG. 3A) for causing the clamp 31 to be in the mounting state and a second position (see FIG. 3B) for causing the clamp 31 to be in the releasing state. The clamp moving portion of the present embodiment includes the shaft portion 32 that is connected to the clamp 31 and moves between the first position and the second position. A movement direction is the longitudinal direction (vertical direction). The first position is a position to which the shaft portion 32 rises, and the second position is a position to which the shaft portion 32 is lowered. The shaft portion 32 of the present embodiment includes one end portion 321 on the bottom surface side (lower side), and the other end portion 322 on the flat surface side (upper side). The one end portion 321 of the shaft portion 32 is forked into two and is connected to the clamp 31. In the present embodiment, a user operates the lever 35 being the releasing operation portion, which is positioned on the flat surface side (upper side) of the case 4. With this, the cam 36 integrated with the lever 35 turns. When being pressed by a cam surface 361 on an outer circumference of the cam 36, the shaft portion 32 moves (is lowered). In the present embodiment, the cam 36 is also a part of the releasing operation portion. Further, the shaft portion 32 is provided with a circular plate portion 323 that receives an urging force of the clamp urging portion 33. The circular plate portion 323 is provided to extend in the horizontal direction.

The clamp urging portion 33 urges the clamp moving portion (shaft portion 32) to the first position. The clamp urging portion 33 is formed of, for example, a compression coil spring. An urging force of the clamp urging portion 33 acts on the clamp 31 via the circular plate portion 323 of the shaft portion 32, as a force in a direction in which the pair of engaging pieces 311 and 311 open.

The retaining portion retains the clamp moving portion at the second position. When the retaining portion retains the clamp moving portion at the second position, the clamp 31 is kept in the releasing state, regardless of an operation position of the lever 35. Therefore, even when a user does not continue operation, the clamp 31 is retained in the releasing state. Further, for example, when the tip tool T is mounted to the clamp 31 by a user, a mounting position of the tip tool T can be easily aligned with the clamp 31 in the releasing state.

Figure 4A:
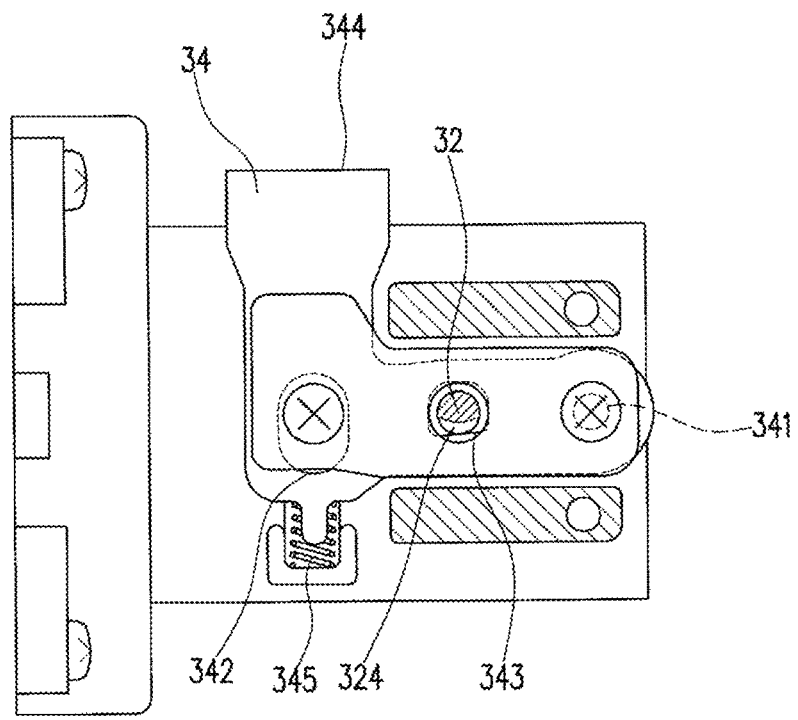
FIG. 4A is a horizontal cross-sectional view partially illustrating a state change of a lock plate in the electric tool, which is taken along the line B in FIG. 1, and corresponding to the mounting state of the clamp.
Figure 4B:
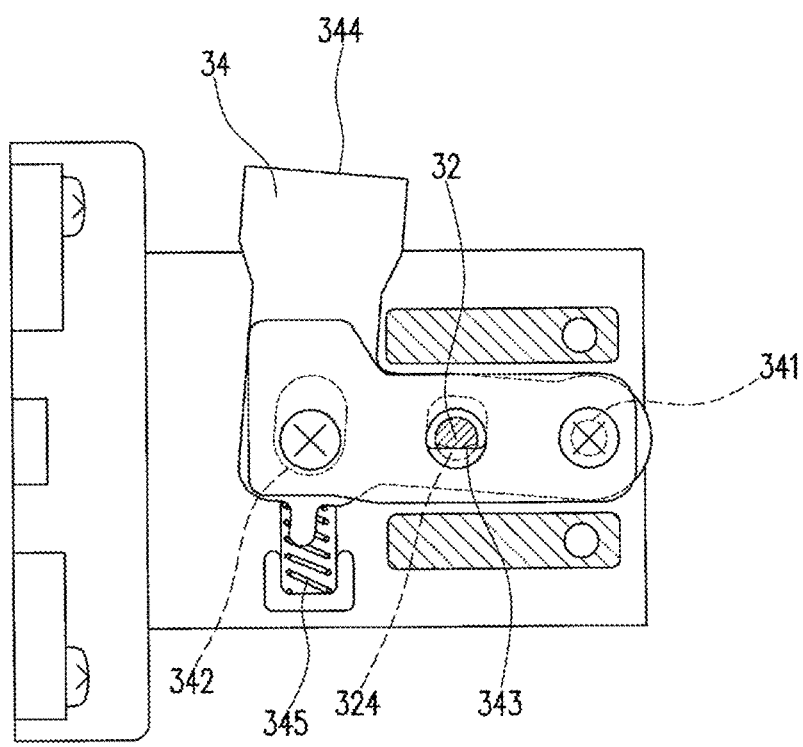
FIG. 4B is a horizontal cross-sectional view partially illustrating a state change of the lock plate in the electric tool, which is taken along the line B in FIG. 1, and corresponding to the releasing state of the clamp.
Figure 5:
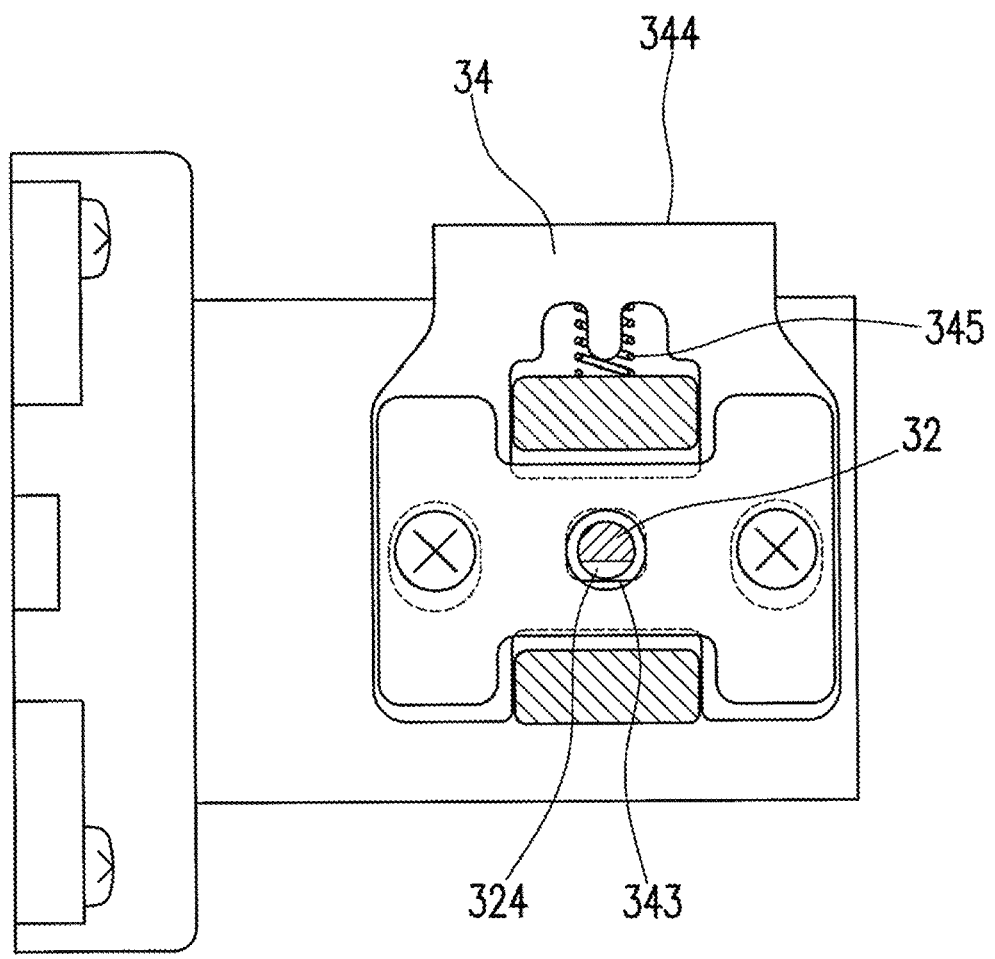
FIG. 5 is a view illustrating a configuration changed such that the lock plate moves in a linear direction in the electric tool.

The retaining portion includes an engaging portion that moves to approach or separate from a shaft center of the shaft portion 32. As illustrated in FIGS. 4A and 4B. The retaining portion of the present embodiment is the lock plate 34 that turns in a direction intersecting the longitudinal direction of the shaft portion 32, specifically, in a predetermined range in a horizontal plane. The lock plate 34 is a plate-shaped body, and a part thereof engaging with the shaft portion 32 has a shape spreading in the horizontal direction. Further, a compression coil spring 345 urges the lock plate 34 in a direction in which the part 344 described later protrudes to the outside of the case 4. When the shaft portion 32 is at the second position, the lock plate 34 is normally retained in the state in FIG. 4B. Note that, for example, as illustrated in FIG. 5, the lock plate 34 may move in a linear direction instead of turning.

As illustrated in FIGS. 4A and 4B, on the tip side in the electric tool 1, the lock plate 34 of the present embodiment includes a turning center hole 341 through which a center shaft (specifically, a screw boss) being a turning center passes. On the base end side in the electric tool 1, an elongated hole 342 is provided, and a regulating shaft (specifically, another screw boss) that regulates a turning range passes through the elongated hole 342. Further, at an intermediate position of the lock plate 34 in the front-and-rear direction, an engagement penetrating hole 343 through which the shaft portion 32 passes is formed. As illustrated in FIG. 4B, a peripheral edge portion of the engagement penetrating hole 343 is engaged with a recessed portion 324 of the shaft portion 32. This engagement is achieved by urging of the compression coil spring 345, and does not require user's operation of the lock plate 34.

Figure 3B:
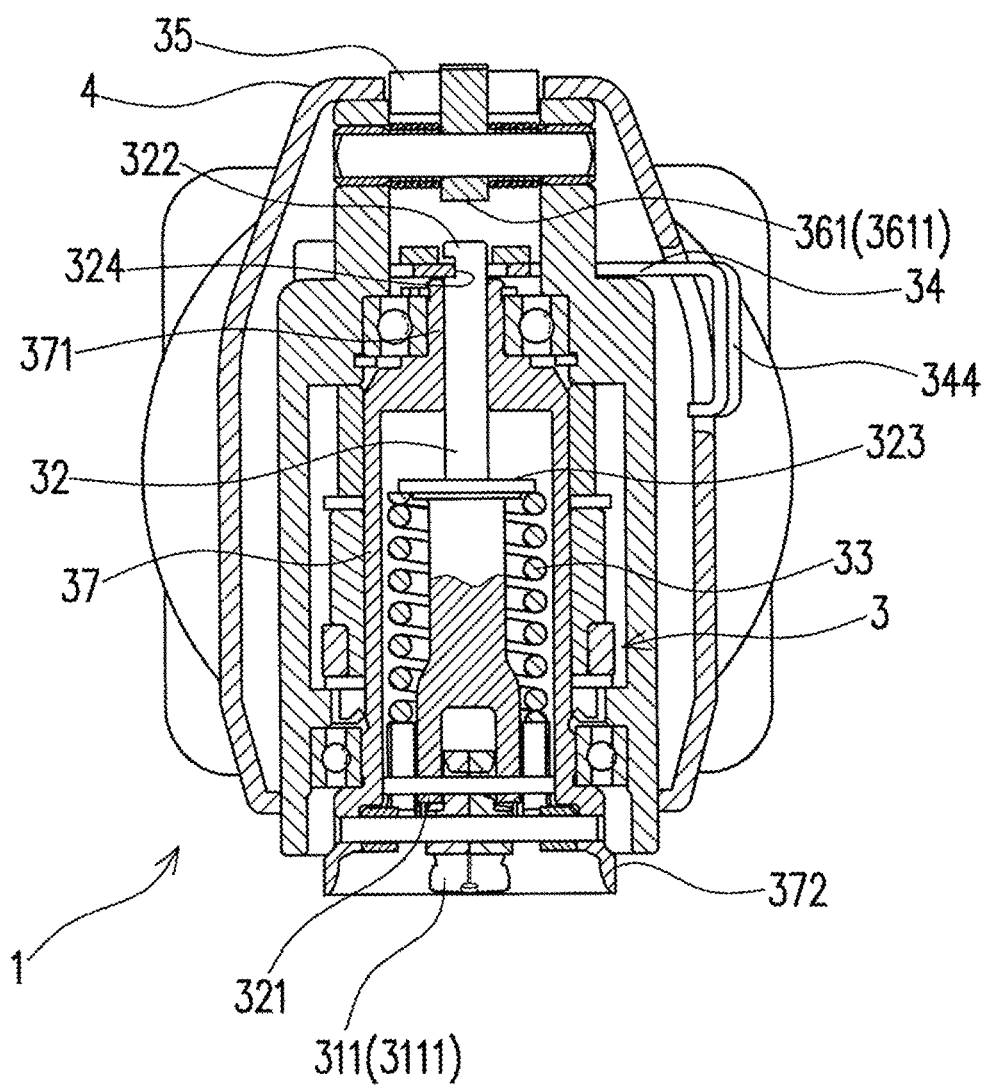
FIG. 3B is a vertical cross-sectional view illustrating the electric tool, which is taken along the line A-A in FIG. 1, and illustrating a releasing state of the clamp.

The shaft portion 32 (clamp moving portion) includes, on a side surface, the recessed portion 324 that is engaged with the lock plate 34 at the second position. More specifically, the recessed portion 324 of the present embodiment has a shape with which the lock plate 34 being the retaining portion (specifically, the peripheral edge portion of the engagement penetrating hole 343) is engaged. The recessed portion 324 is a groove portion formed in a direction intersecting the longitudinal direction of the shaft portion 32 (specifically, in the horizontal direction). Thus, as illustrated in FIG. 3B, the recessed portion 324 provided in the shaft portion 32 is engaged with the lock plate 34 being the retaining portion (specifically, the peripheral edge portion of the engagement penetrating hole 343). In the present embodiment, the recessed portion 324 is provided in the other end portion 322 of the shaft portion 32. However, the position of the recessed portion 324 in the shaft portion 32 is not limited thereto.

Thus, when the clamp 31 is in the mounting state, the peripheral edge portion the engagement penetrating hole 343 of the lock plate 34 press-contacts with the side surface of the shaft portion 32 (part that does not have the recessed portion 324). Then, the state illustrated in FIG. 4A is obtained. Meanwhile, when the clamp 31 is in the releasing state, the peripheral edge portion the engagement penetrating hole 343 of the lock plate 34 enters the recessed portion 324 of the shaft portion 32, due to urging of the compression coil spring 345. Then, the state illustrated in FIG. 4B is obtained.

Along with engagement of the lock plate 34 with the recessed portion 324, the shaft portion 32 is not allowed to move in the longitudinal direction. Thus, the clamp 31 is retained in the releasing state.

The mounting operation portion receives mounting operation for switching the clamp 31 from the releasing state to the mounting state. When the mounting operation portion receives the mounting operation, the retaining portion cancels retaining of the clamp moving portion at the second position. When the clamp 31 is switched from the releasing state to the mounting state, a user operates the mounting operation portion of the present embodiment and thus releases engagement of the peripheral edge portion of the engagement penetrating hole 343 of the lock plate 34 with the recessed portion 324. Further, the mounting operation portion is the part 344 that is formed integrally with the lock plate 34, protrudes from the case 4, and is positioned on a side surface side of the case 4. The mounting operation portion moves to be pushed into the case 4 along with operation by a user when the clamp 31 is switched from the releasing state to the mounting state, that is, the mounting operation.

The clamp 31 is positioned on the bottom surface side of the case 4. Thus, for example, a user first positions (places) the tip tool T on a surface on the bottom surface side of the case 4 (for example, a floor surface or an upper surface of a work table), and then aligns the bottom end portion 372 of the cylindrical portion 37 with the base end portion T2 of the tip tool T. Moreover, the mounting operation portion on the side surface side of the case 4 (the part 344 of the lock plate 34, which protrudes from the case 4) is operated, and thus the tip tool T can be mounted to the clamp 31. Therefore, operability is satisfactory for a user.

Figure 6:
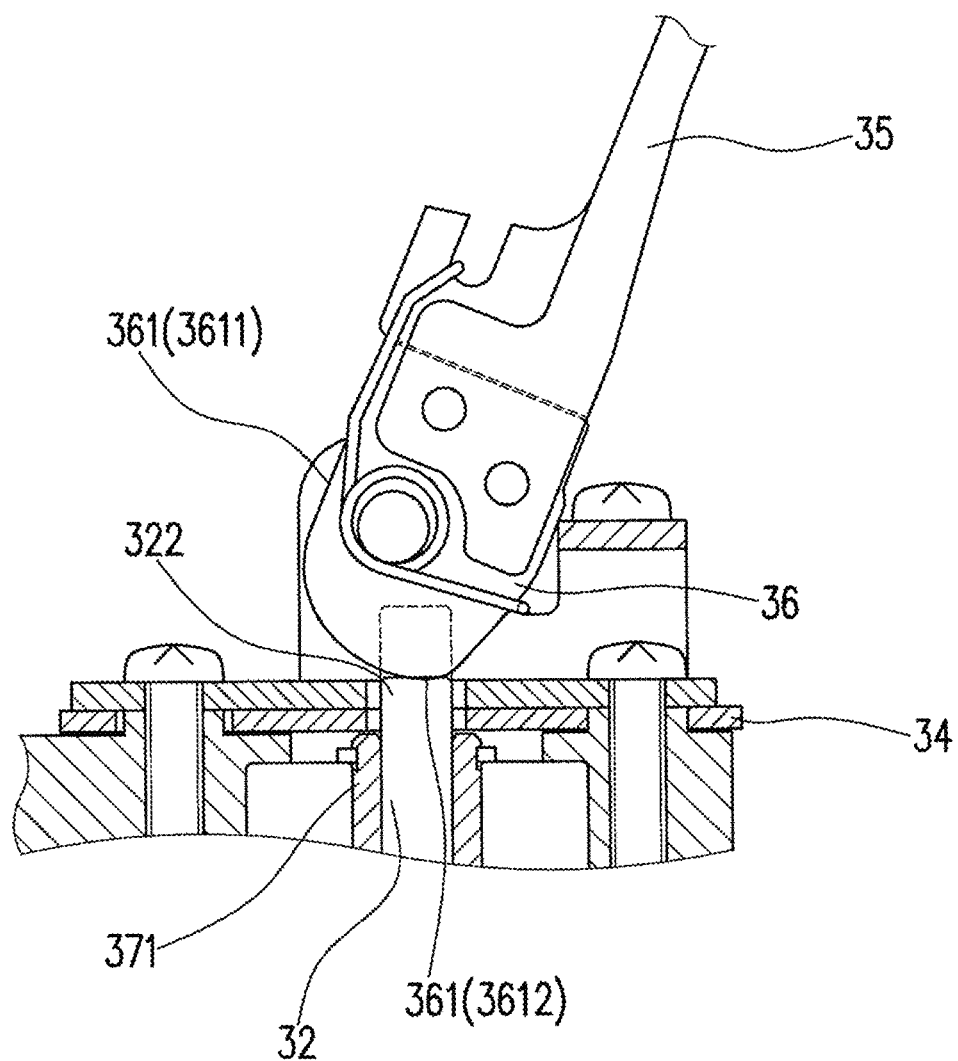
FIG. 6 is a vertical cross-sectional view of main parts, illustrating a state in which a cam presses a shaft portion in the electric tool.

The releasing operation portion receives releasing operation for switching the clamp 31 from the mounting state to the releasing state. A user operates the releasing operation portion of the present embodiment when the clamp 31 is switched from the mounting state to the releasing state. The releasing operation portion includes the lever 35 that is exposed from the case 4 and turns to rise from the surface of the case 4. The lever 35 is formed integrally with the cam 36 positioned at the turning center of the lever 35. As illustrated in FIG. 6, the lever 35 turns to rise in a side view. With this, the cam surface 361 of the cam 36 presses the shaft portion 32 being the clamp moving portion and moves the shaft portion 32 from the first position to the second position. Regardless of a turning position of the lever 35, the shaft portion 32 after moving is retained at the second position, due to engagement between the retaining portion (lock plate 34) and the recessed portion 324. Specifically, in a case where the shaft portion 32 is at the second position, even when the lever 35 is restored from the state illustrate in FIG. 6 to the state illustrated in FIG. 1, the shaft portion 32 is retained at the second position. Thus, as illustrated in FIG. 3B, the state in which the other end portion 322 of the shaft portion 32 and the cam 36 are away from each other is obtained.

The movement direction of the releasing operation portion, that is, the movement direction in which the clamp 31 is switched from the mounting state to the releasing state is a direction away from the case 4 (specifically, an upward direction). In contrast, the movement direction of the mounting operation portion (the part 344 of the lock plate 34) operated for mounting the tip tool T is a direction of approaching the case 4, specifically, a lateral direction. Thus, the releasing operation portion and the mounting operation portion are operated in different directions. Therefore, a user can easily identify each operation portion.

Second Embodiment

Figure 7A:
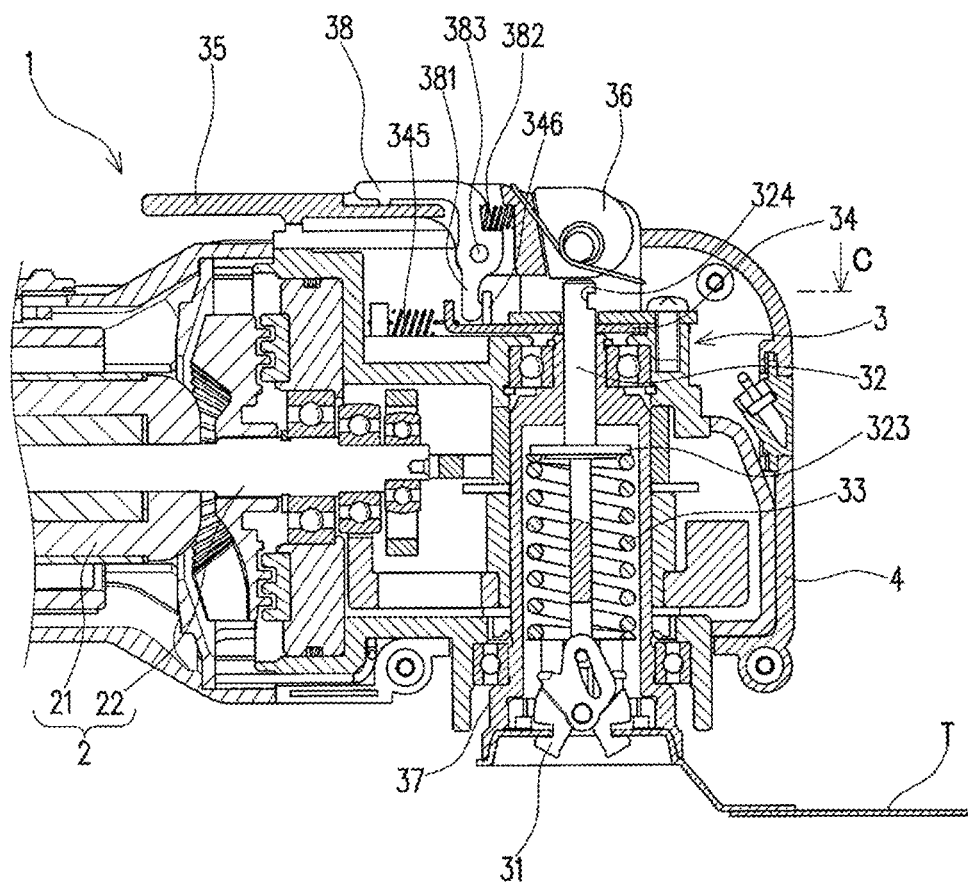
FIG. 7A is a vertical cross-sectional view in a front-and-rear direction, illustrating a tip portion of an electric tool according to a second embodiment of the present invention.
Figure 7B:
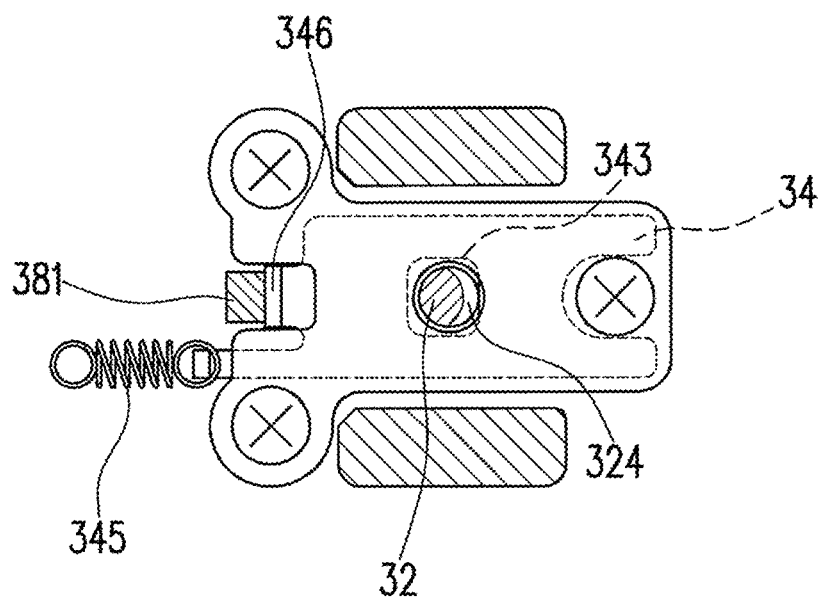
FIG. 7B is a horizontal cross-sectional view partially illustrating a periphery of a lock plate of the electric tool according to the second embodiment of the present invention, which is taken along the line C in FIG. 7A.
Figure 8A:
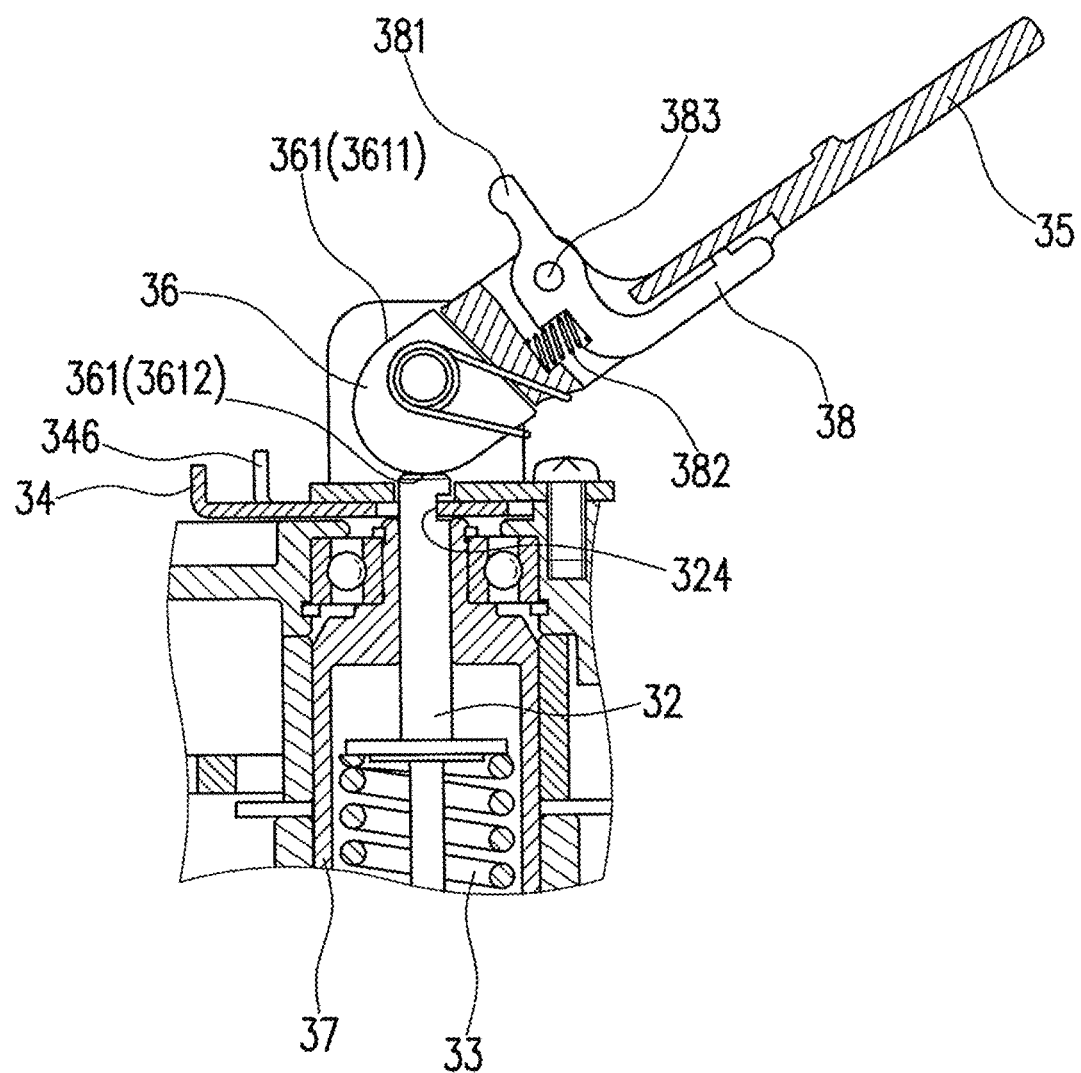
FIG. 8A is a vertical cross-sectional view of main parts of the electric tool, illustrating a state in which a cam presses a shaft portion.

A second embodiment is illustrated in FIG. 7A to FIG. 8A. In the present embodiment, a lock releasing lever 38 being the releasing operation portion is provided to the lever 35. As illustrated in FIG. 7A and FIG. 8A, the lock releasing lever 38 turns integrally with the lever 35 about the shaft portion 32. Further, the lock releasing lever 38 is provided to turn with respect to the lever 35.

Figure 8B:
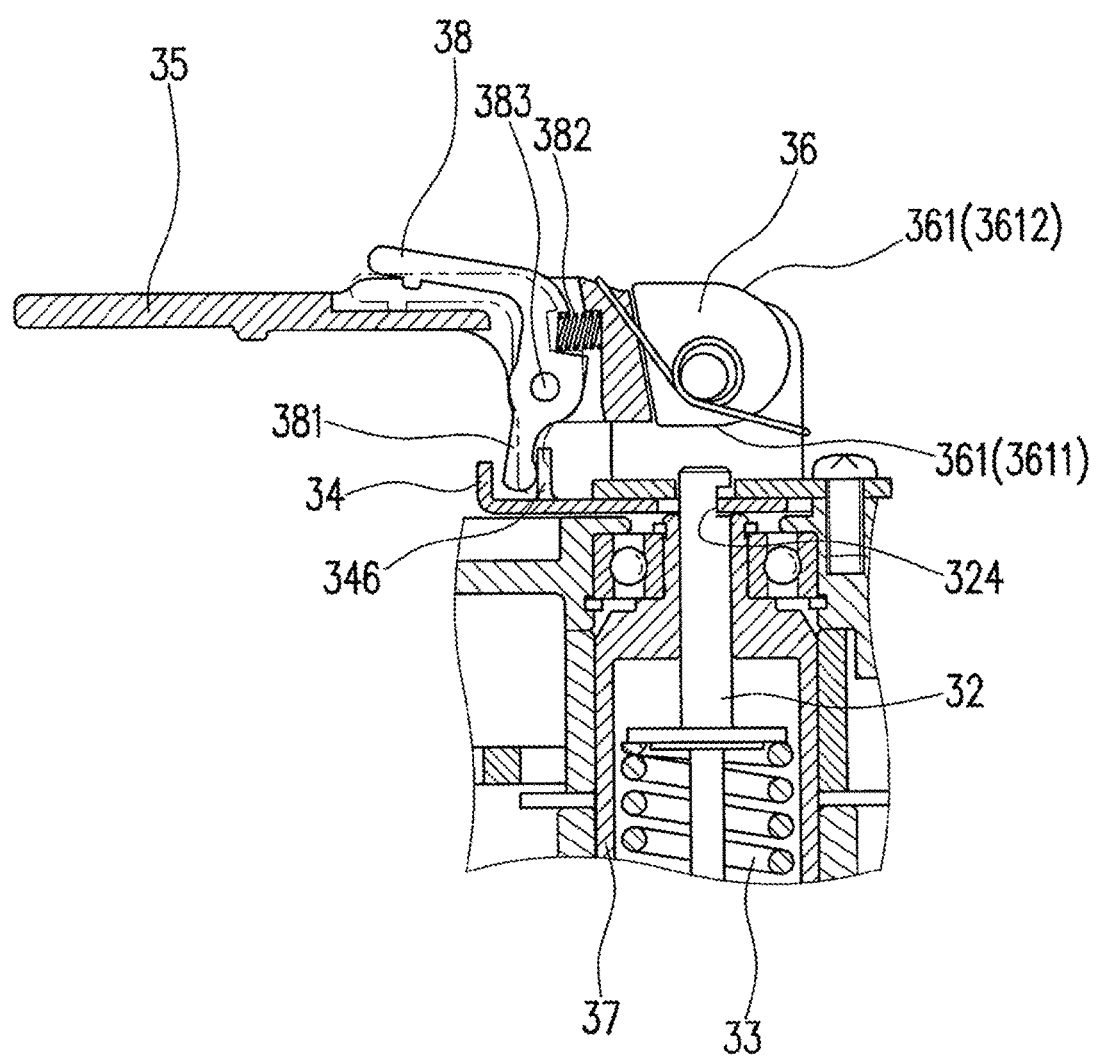
FIG. 8B is a vertical cross-sectional view of main parts of the electric tool, illustrating a state in which a lock releasing lever can be operated in a releasing state of a clamp.

In the state illustrated in FIG. 7A, the lock releasing lever 38 includes a protruding portion 381 that protrudes to the lock plate 34 with respect to a turning center 383 for the lever 35. The lock releasing lever 38 is urged by an urging spring 382 in a counter-clockwise direction in the illustration. Further, as illustrated in FIGS. 7A and 7B, a claw portion 346 rises from the lock plate 34. Note that the lock plate 34 of the present embodiment moves in the linear direction (a right-and-left direction in FIG. 7B). As illustrated in FIG. 8B, when, at the second position, the lock plate 34 (the engagement penetrating hole 343) is engaged with the recessed portion 324 of the shaft portion 32, the lock releasing lever 38 is pushed by the claw portion 346 of the lock plate 34 that moves to the left side in the illustration and turns in a clockwise direction in the illustration (the state before turning is indicated with the two-dot chain line). Then, a part of the lock releasing lever 38 rises from the lever 35. Moreover, when the lock releasing lever 38 is pushed in toward the lever 35, the lock releasing lever 38 turns in the counter-clockwise direction in the illustration, and the protruding portion 381 pushes the claw portion 346 to the right side in the illustration. With this, the lock plate 34 moves, and engagement of the lock plate 34 (the engagement penetrating hole 343) with the recessed portion 324 of the shaft portion 32 is released. As a result, the shaft portion 32 moves from the second position to the first position.

Note that the lock releasing lever 38 of the present embodiment is provided to turn with respect to the lever 35. However, the lock releasing lever 38 is not limited thereto and may also be provided to perform linear motion such as horizontal motion with respect to the lever 35.

Third Embodiment

Figure 9:
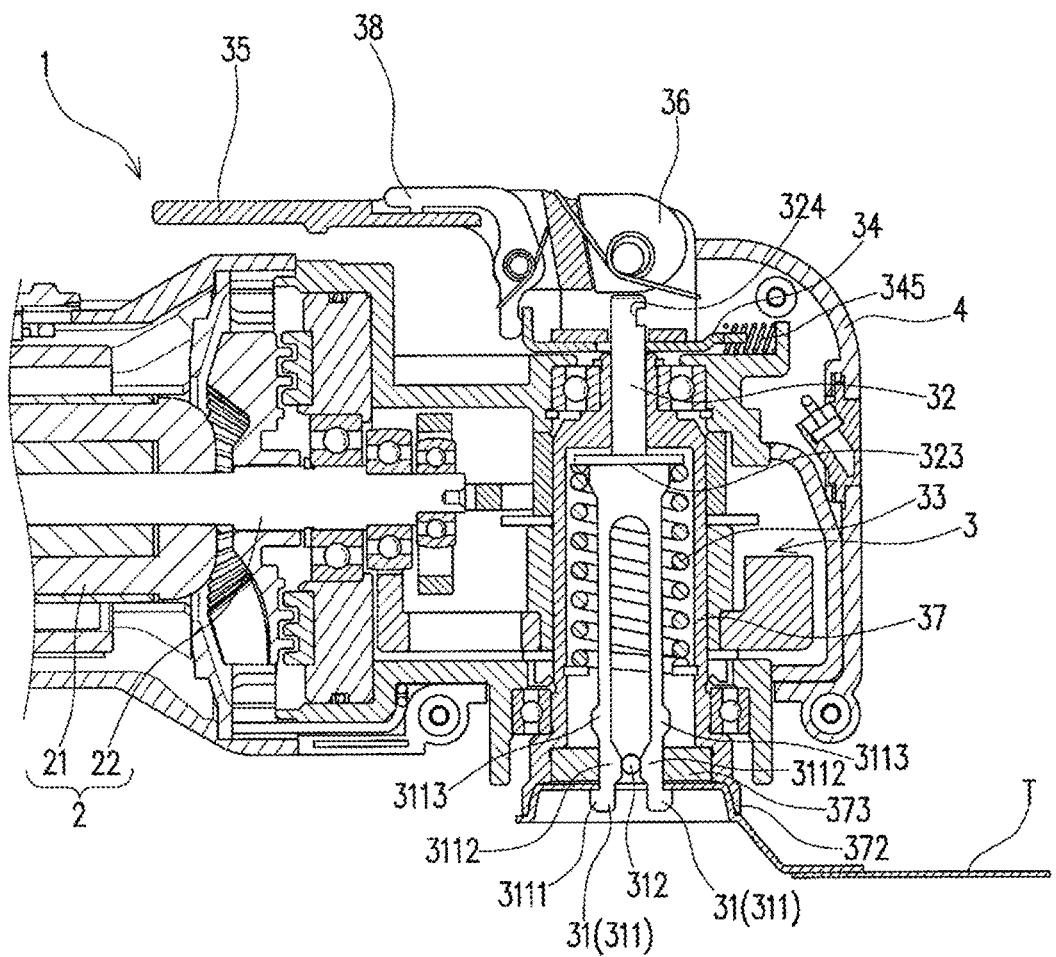
FIG. 9 is a vertical cross-sectional view in a front-and-rear direction, illustrating a tip portion of an electric tool according to a third embodiment of the present invention.
Figure 10A:
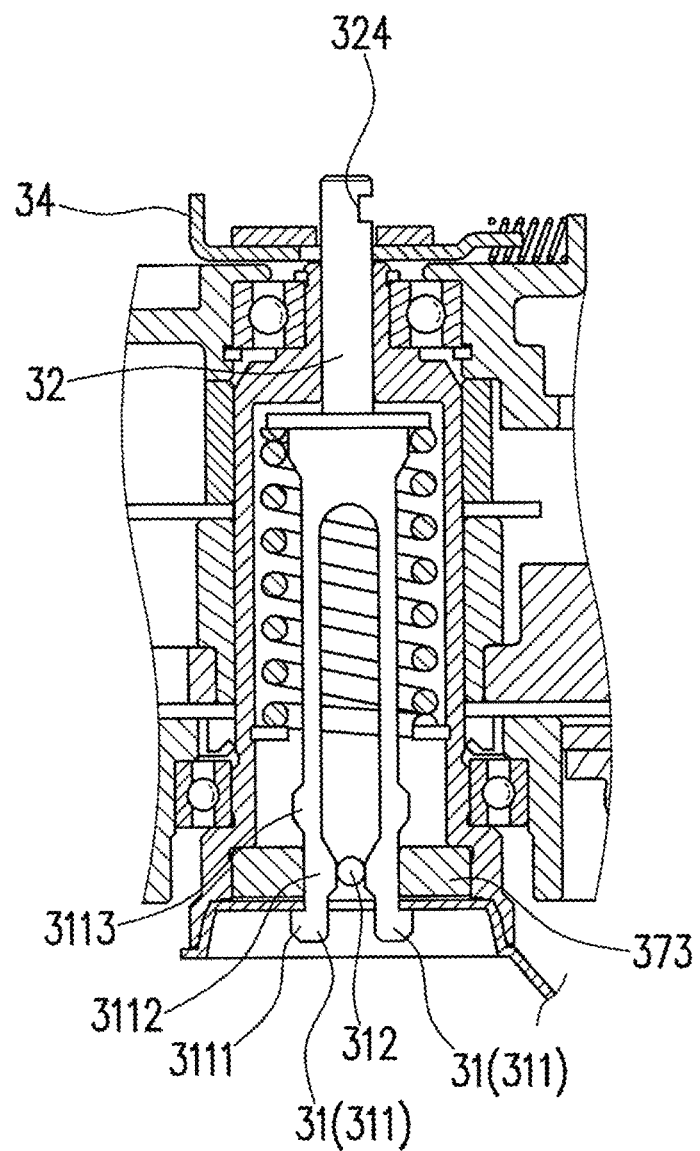
FIG. 10A is a vertical cross-sectional view of main parts in the front-and-rear direction, sequentially illustrating a state change from a mounting state to a releasing state of a clamp in the electric tool.
Figure 10B:
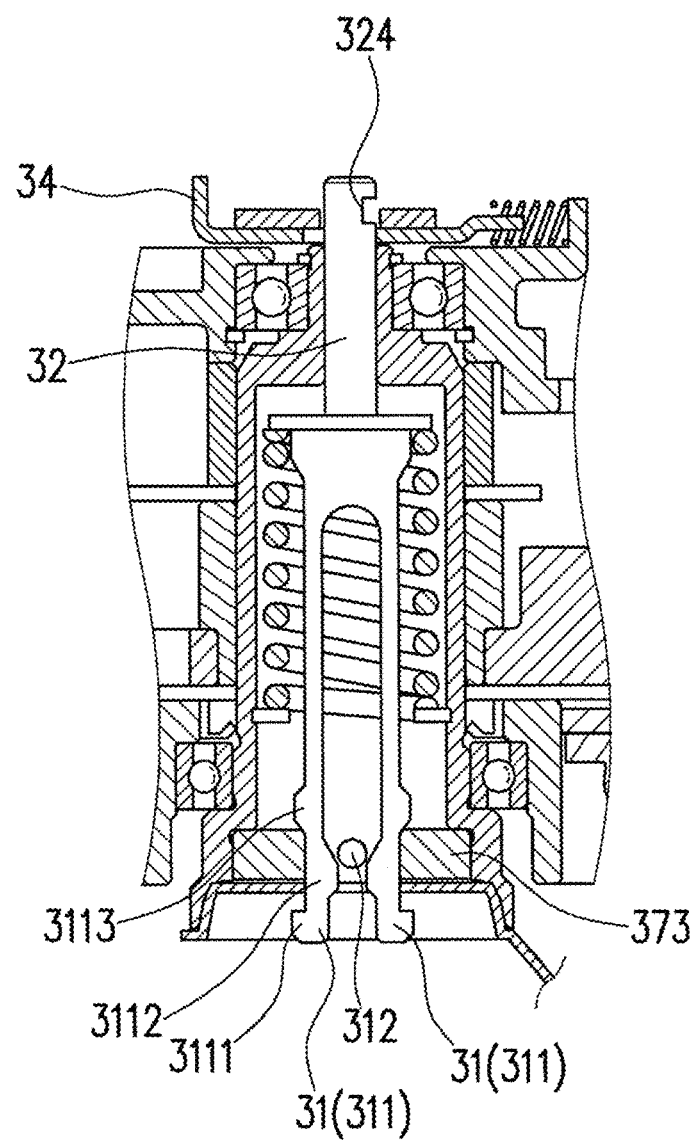
FIG. 10B is a vertical cross-sectional view of the main parts in the front-and-rear direction, sequentially illustrating a state change from the mounting state to the releasing state of the clamp in the electric tool.
Figure 10C:
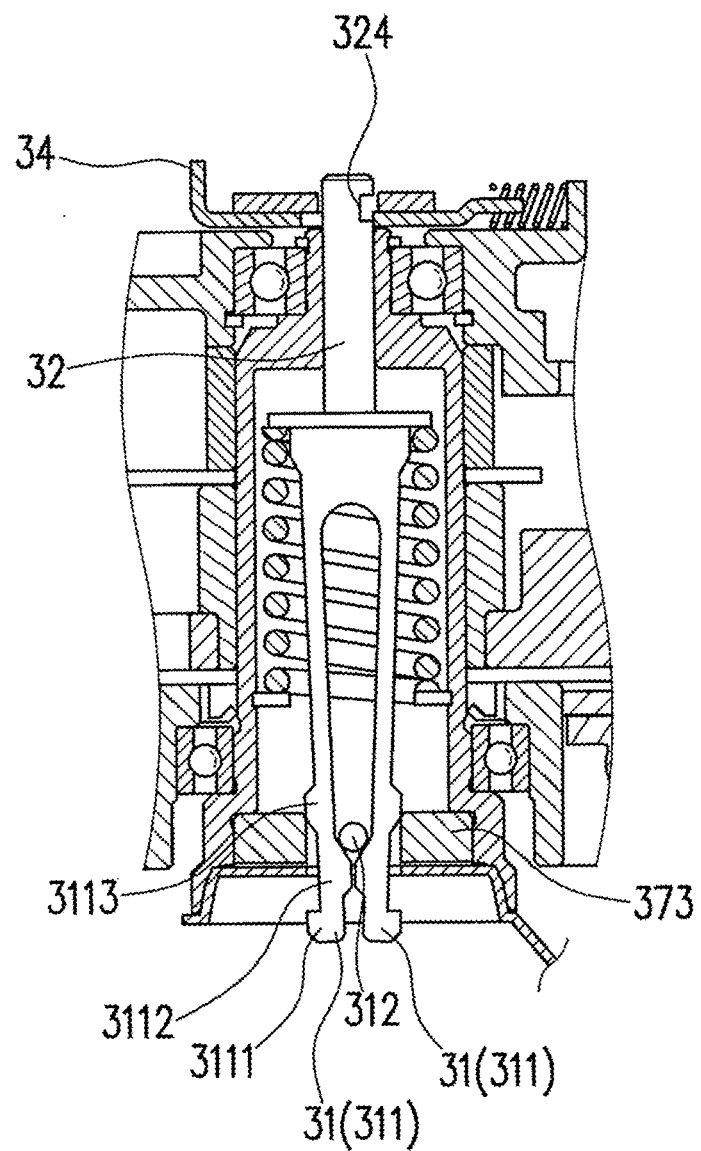
FIG. 10C is a vertical cross-sectional view of the main parts in the front-and-rear direction, sequentially illustrating a state change from the mounting state to the releasing state of the clamp in the electric tool.
Figure 10D:
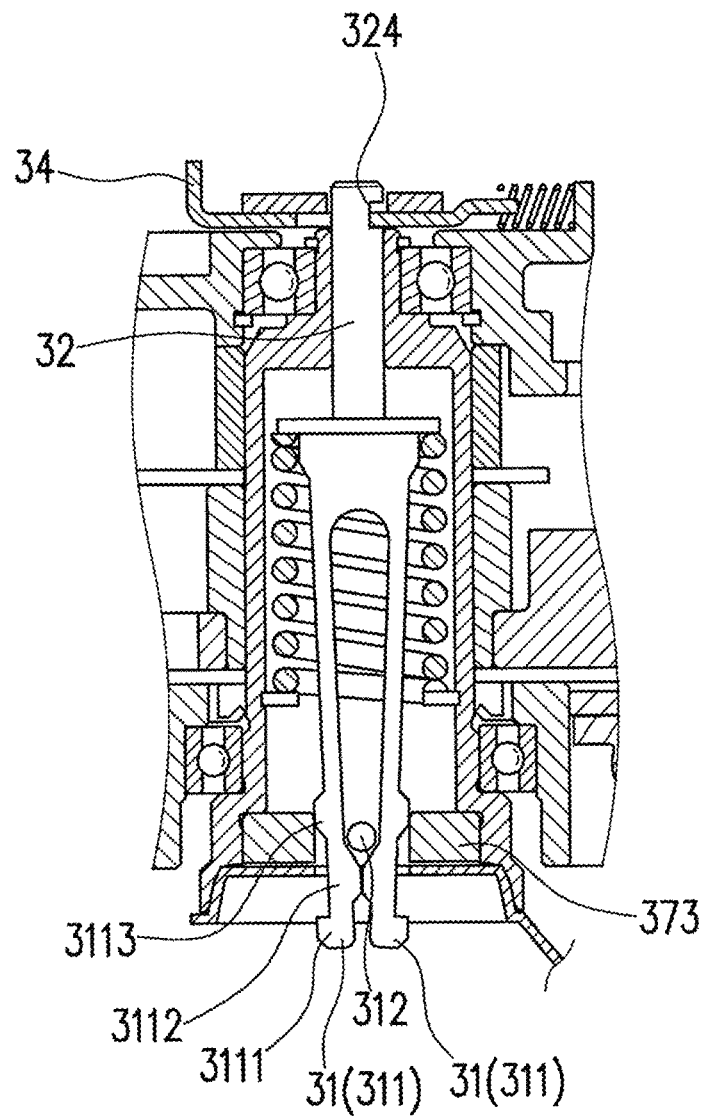
FIG. 10D is a vertical cross-sectional view of the main parts in the front-and-rear direction, sequentially illustrating a state change from the mounting state to the releasing state of the clamp in the electric tool.

A third embodiment is illustrated in FIG. 9 to FIG. 10D. As illustrated in FIG. 9, the present embodiment is similar to the second embodiment in that the lock releasing lever 38 is provided to the lever 35. However, in the present embodiment, shapes of the shaft portion 32 being the clamp moving portion and the clamp 31 are different from those in the other embodiments. The clamp 31 and the shaft portion 32 of the present embodiment are formed integrally. Further, the base portion (upper portion) of the pair of engaging pieces 311 and 311 is integrated. The tip side (lower end side) thereof receives an external force and is deformed in approaching and separating directions. In order to broaden a space between the pair of clamp claw portions 3111 and 3111, a pin 312 is provided between the pair of engaging pieces 311 and 311. Further, a bottom plate 373 is provided to the bottom end portion 372 of the cylindrical portion 37. The pair of engaging pieces 311 and 311 pass through the center of the bottom plate 373, in a movable manner in the longitudinal direction.

FIG. 10A illustrates the mounting state. The pin 312 abuts on an inner protruding portion 3112 protruding from each of the engaging pieces 311 in a facing direction. FIG. 10B illustrates a state in which the shaft portion 32 moves (is lowered) slightly to a bottom portion side and the abutting state between the inner protruding portion 3112 and the pin 312 is about to be released. Note that, although not illustrated, similar to the other embodiments, the shaft portion 32 is lowered by operating the lever 35. FIG. 10C illustrates a state in which the shaft portion 32 (as well as the clamp 31) further moves (is lowered) to the bottom portion side. The abutting state between the inner protruding portion 3112 and the pin 312 is released, and an inner circumferential portion of the bottom plate 373 abuts on an outer protruding portion 3113 that protrudes from each of the engaging pieces 311 in a direction opposite to the facing direction. With this, the space between the pair of engaging pieces 311 and 311 is closed. FIG. 10D illustrates the releasing state. This state is a state in which the shaft portion 32 moves (is lowered) slightly to the bottom portion side from the state in FIG. 10C and the lock plate 34 is engaged with the recessed portion 324.

Fourth Embodiment

A fourth embodiment is illustrated in FIG. 11A to FIG. 12B. In the present embodiment, unlike the other embodiments, the lock plate 34 and the recessed portion 324 of the shaft portion 32 are not engaged with each other. In the present embodiment, the cam 36 functions as the retaining portion.

Figure 11A:
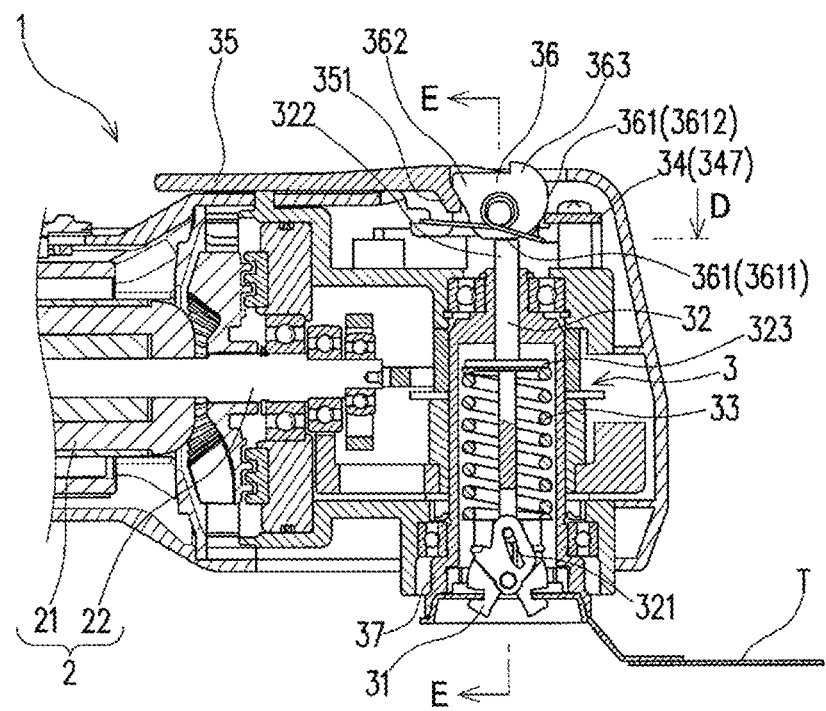
FIG. 11A is a vertical cross-sectional view in a front-and-rear direction, illustrating a tip portion of an electric tool (mounting state) according to a fourth embodiment of the present invention.

The cam 36 shares the same turning center of the lever 35. However, the cam 36 is not integrated with the lever 35 and turns independently. A cam engaging portion 351 is provided to a part of the lever 35, which faces the cam 36. Moreover, a part of the cam 36, which faces the cam engaging portion 351, is a lever engaging portion 362. As illustrated in FIG. 11A, under a state in which the cam engaging portion 351 and the lever engaging portion 362 abut on each other, when the lever 35 turns in the clockwise direction in the illustration, the cam 36 also turns together. Moreover, after the turning, while the cam 36 remains in the state after the turning (the state in which the cam 36 turns by approximately 90 degrees from the posture illustrated in FIG. 11A in the clockwise direction in illustrated), only the lever 35 turns in the counter-clockwise direction, and thus the cam engaging portion 351 and the lever engaging portion 362 are away from each other. With this, the state illustrated in FIG. 12A is obtained.

The cam 36 includes the cam surface 361 that moves the shaft portion 32 by turning while abutting on the other end portion 322 of the shaft portion 32. Further, under a state of facing the clamp 31, the cam surface 361 includes: a distal portion 3611 far from the clamp 31 and a proximal portion 3612 close to the clamp 31. As in the present embodiment, in the case of the cam 36 including the cam surface 361 formed in the circumferential direction with the turning center as a reference, a small diameter portion away from the turning center of the cam 36 by a short distance is the distal portion 3611. Further, a large diameter portion away from the turning center of the cam 36 by a long distance is the proximal portion 3612. Moreover, the cam 36 includes a step portion 363 that is engaged with the lock plate 34.

As illustrated in FIG. 11A, when the distal portion 3611 of the cam 36 abuts on the other end portion 322 of the shaft portion 32, the shaft portion 32 is at the first position. Moreover, when the proximal portion 3612 of the cam 36 abuts on the other end portion 322 of the shaft portion 32, the shaft portion 32 is at the second position. Specifically, when the proximal portion 3612 of the cam 36 abuts on the other end portion 322 of the shaft portion 32, the clamp 31 is in the releasing state. When the proximal portion 3612 and the other end portion 322 of the shaft portion 32 abut on each other, the abutting position is positioned on the front side with respect to the turning center of the cam 36 (see FIG. 12A). With this positional relationship, an urging force of the clamp urging portion 33, which acts on the proximal portion 3612 via the other end portion 322, functions as a turning force acting in a direction in which the cam 36 turns in the counter-clockwise direction. The lock plate 34 of the present embodiment regulates turning of the cam 36 in the counter-clockwise direction, which is caused by this turning force.

Figure 11B:
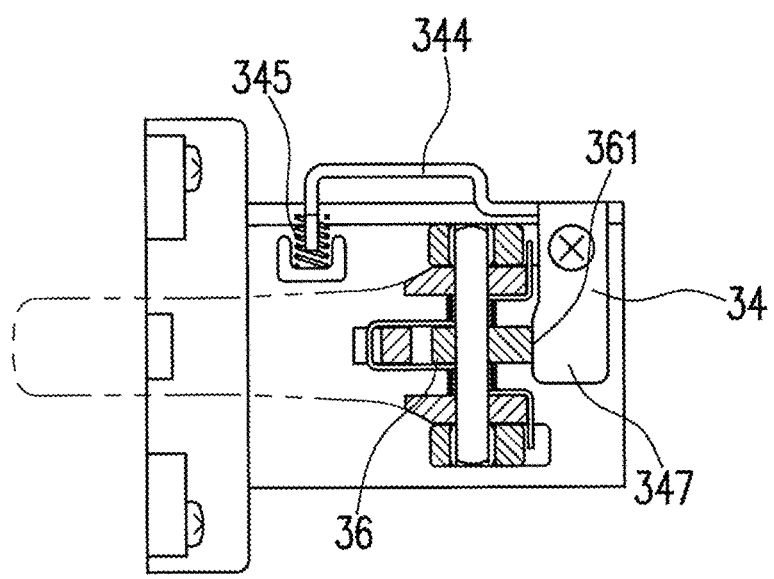
FIG. 11B is a horizontal cross-sectional view partially illustrating a periphery of a lock plate of the electric tool (mounting state) according to the fourth embodiment of the present invention, which is taken along the line D in FIG. 11A.
Figure 11C:
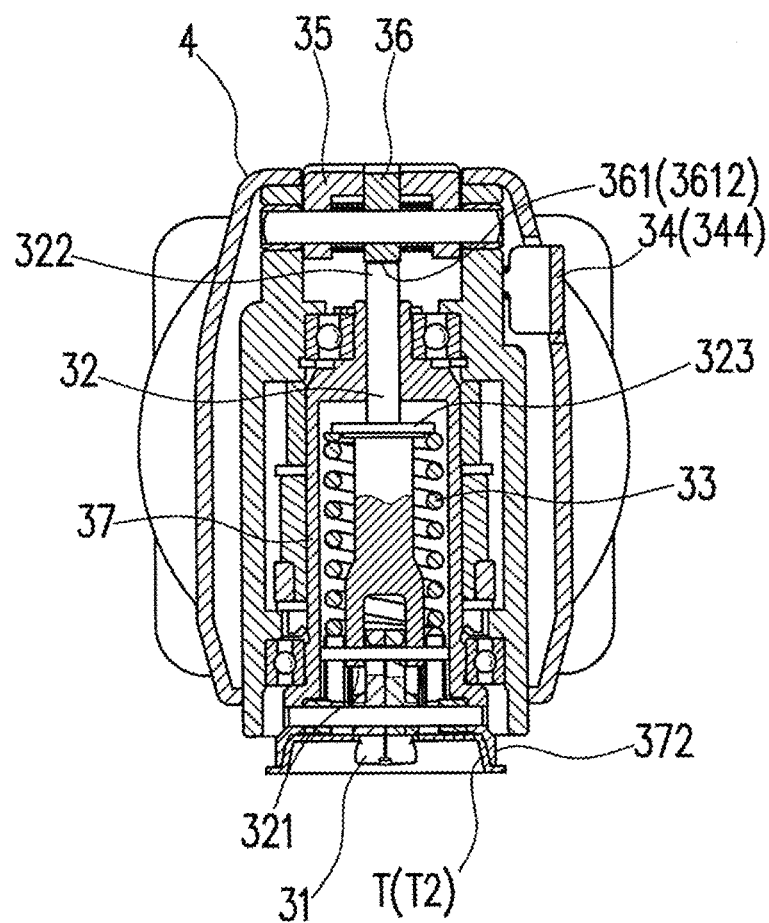
FIG. 11C is a vertical cross-sectional view taken along the line E-E in FIG. 11A.
Figure 12B:
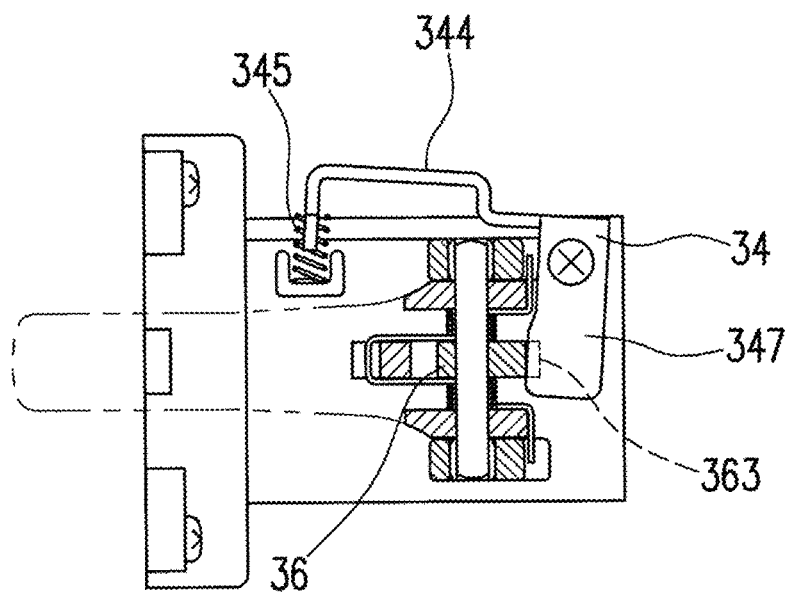
FIG. 12B is a horizontal cross-sectional view partially illustrating a periphery of the lock plate of the electric tool (releasing state), which is taken along the line F in FIG. 12A.
Figure 12C:
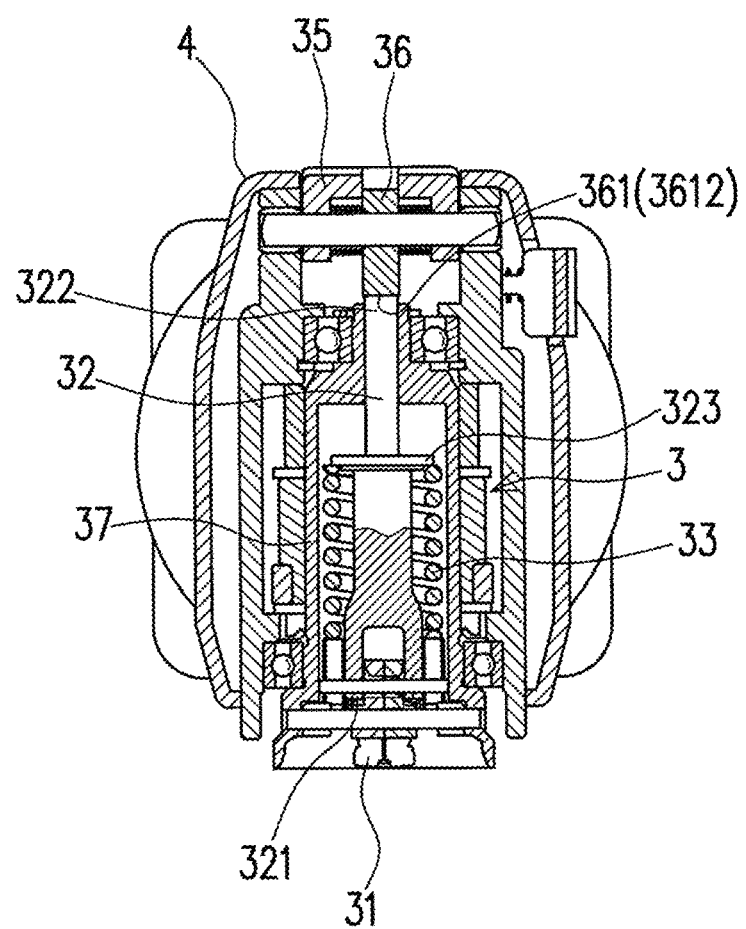
FIG. 12C is a vertical cross-sectional view taken along the line G-G in FIG. 12A.
Figure 13A:
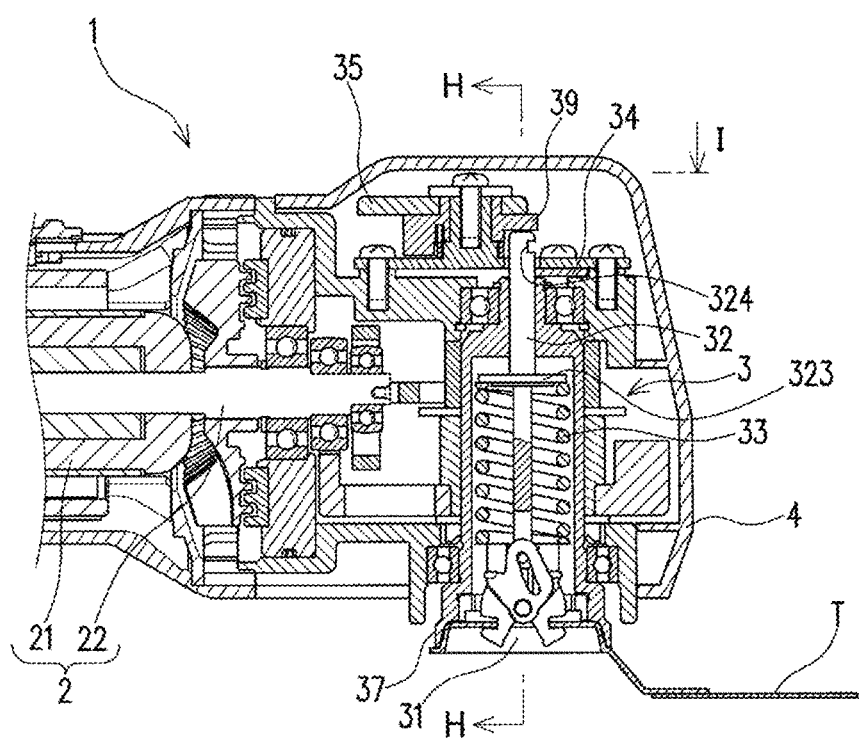
FIG. 13A is a vertical cross-sectional view in a front-and-rear direction, illustrating a tip portion of an electric tool according to a fifth embodiment of the present invention.
Figure 13B:
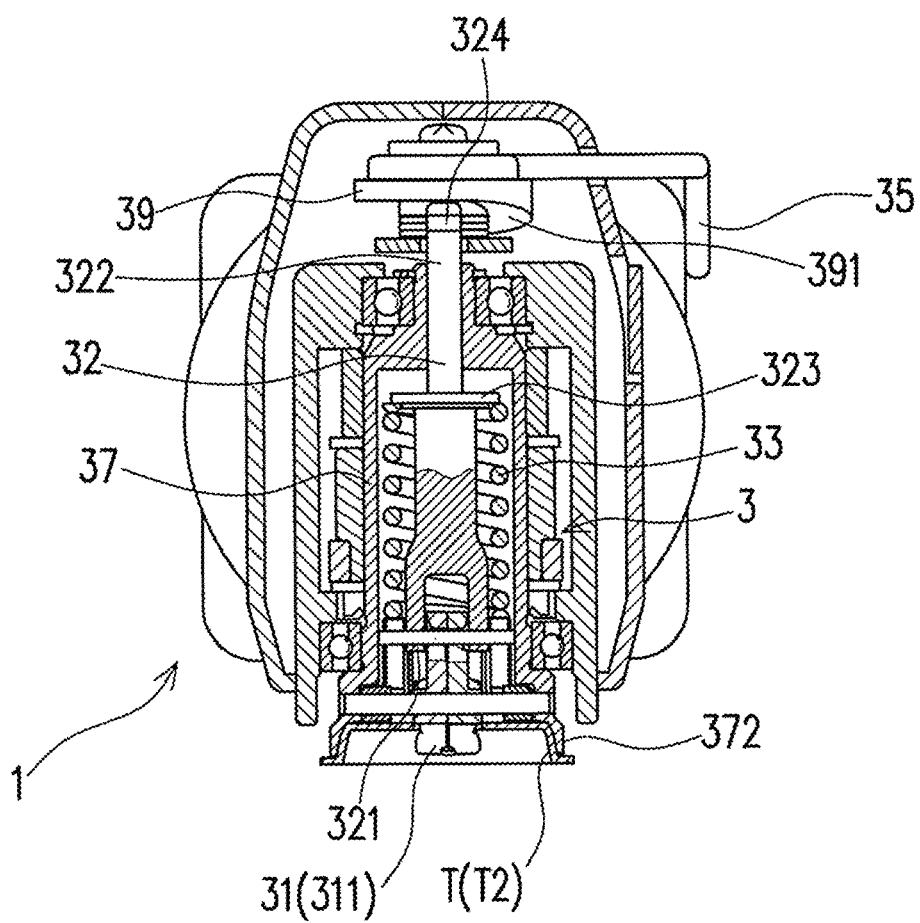
FIG. 13B is a vertical cross-sectional view taken along the line H-H in FIG. 13A.

As illustrated in FIG. 11B and FIG. 12B, the lock plate 34 of the present embodiment has a substantially L-like shape in a plan view. One side of the "substantially L-like shape" is urged by the compression coil spring 345 in the clockwise direction in the illustration. When the clamp 31 is in the mounting state, an engaging piece 347 being the other side of the "substantially L-like shape" of the lock plate 34 press-contacts with the cam surface 361. With this, the state illustrated in FIG. 11B is obtained. Meanwhile, when the clamp 31 is in the releasing state, due to urging of the compression coil spring 345, the engaging piece 347 is positioned above the step portion 363 of the cam 36 and is engaged with the step portion 363. With this, the state illustrated in FIGS. 12A and 12B is obtained. Along with this engagement, the cam 36 is not allowed to turn in the counter-clockwise direction in the illustration. Specifically, turning of the cam 36 in the counter-clockwise direction, which is caused by the turning force, is regulated. Therefore, the state in which the shaft portion 32 abuts on the proximal portion 3612 of the cam 36 is kept, and the shaft portion 32 cannot move upward in the longitudinal direction.

Fifth Embodiment

A fifth embodiment is illustrated in FIG. 13A to FIG. 14B. The lever 35 of the present embodiment turns in the horizontal direction. Further, a cylindrical end surface cam 39 is fixed to the lever 35 of the present embodiment. A cam surface 391 being a bottom end surface of the end surface cam 39 is an inclined surface that is curved to protrude sequentially to the bottom surface side in the circumferential direction. Similarly to the cam surface 361 of the cam 36 of the other embodiments, along with turning of the lever 35, the cam surface 391 presses the shaft portion 32. Similarly to the fourth embodiment, the cam surface 391 includes a distal portion 3911 far from the clamp 31 and a proximal portion 3912 close to the clamp 31. In the case of the end surface cam 39 including the cam surface 391 formed on an end surface in an axial direction of the cylindrical body as in the present embodiment, a part of the inclined surface, which is positioned on an upper side, is the distal portion 3911. Further, a part of the inclined surface, which is positioned on a lower side, is the proximal portion 3912.

Figure 14A:
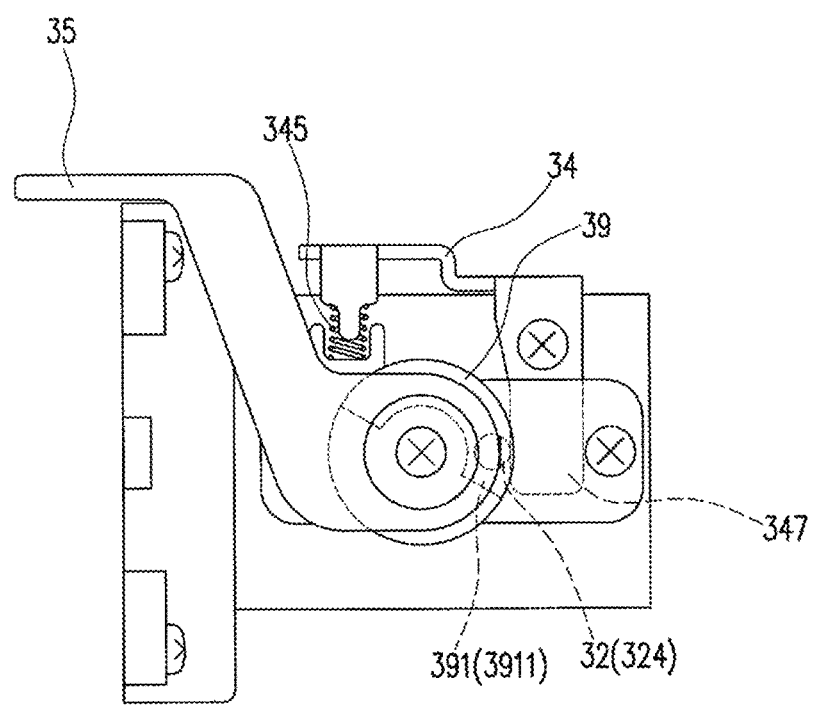
FIG. 14A is a horizontal cross-sectional view of main parts taken along the line I in FIG. 13A, illustrating a state change of a lever in the electric tool and corresponding to a mounting state of a clamp.
Figure 14B:
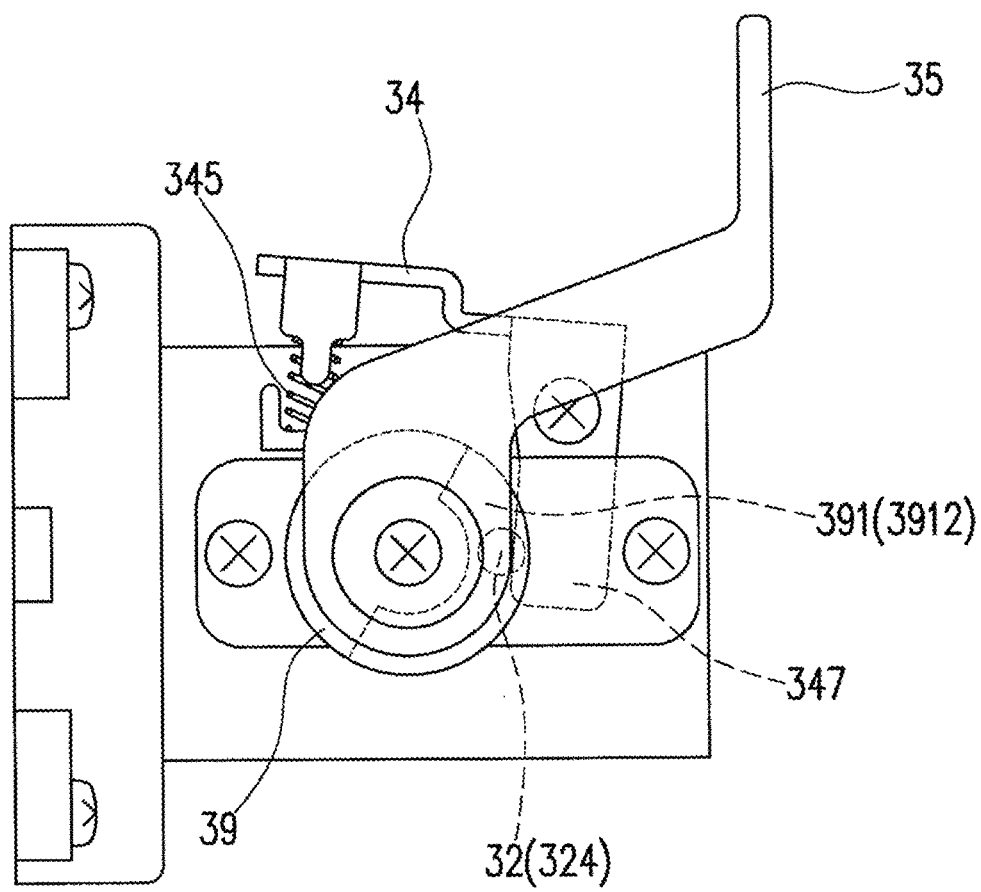
FIG. 14B is a horizontal cross-sectional view of main parts taken along the line I in FIG. 13A, illustrating a state change of the lever in the electric tool and corresponding to a releasing state of the clamp.

As illustrated in FIGS. 14A and 14B, the lock plate 34 of the present embodiment has a substantially L-like shape in a plan view. One side of the "substantially L-like shape" is urged by the compression coil spring 345 in the clockwise direction in the illustration. When the clamp 31 is in the mounting state, the engaging piece 347 being the other side of the "substantially L-like shape" of the lock plate 34 press-contacts with the side surface of the shaft portion 32 (part that does not have the recessed portion 324). Then, the state illustrated in FIG. 14A is obtained. Meanwhile, when the clamp 31 is in the releasing state, due to urging of the compression coil spring 345, the engaging piece 347 enters the recessed portion 324 of the shaft portion 32 and is engaged with the recessed portion 324. Then, the state illustrated in FIG. 14B is obtained. Along with this engagement, the shaft portion 32 is not allowed to move an upper side of the longitudinal direction.

The electric tool according to the first embodiment to the fifth embodiment exerts an effect of easy removal of the tip tool and satisfactory manageability.

Described are the first embodiment to the fifth embodiment given as examples. However, the present invention is not limited to those embodiments, and various modifications can be made without departing from the essential spirit of the present invention.

For example, the electric tool 1 may be a rotary tool and a hitting tool. The tip tool T is not limited to a cutter as in each of the embodiments and may be, for example, a driver bit.

Further, a lever for operating the lock plate 34 may be provided as an independent body from the lock plate 34. The lever may be supported by, for example, the case 4.

Further, in place of the cam 36 of the fourth embodiment, the cylindrical end surface cam 39 of the fifth embodiment may be used.

Further, in place of the cam 36, a moving body that linearly moves in a direction intersecting the axial line of the shaft portion 32 and includes an inclined surface protruding sequentially to the bottom surface side in the movement direction may be employed. This moving body may include parts corresponding to the distal portion 3611 and the proximal portion 3612 of the cam 36.

REFERENCE SIGNS LIST

1 Electric tool
2 Driving unit
3 Tip tool mounting mechanism
4 Case
5 Power cord
21 Motor
22 Transmission mechanism
31 Clamp
32 Shaft portion (clamp moving portion)
33 Clamp urging portion
34 Lock plate (retaining portion, mounting operation portion)
35 Lever (releasing operation portion)
36 Cam
37 Cylindrical portion
38 Lock releasing lever
39 End surface cam
221 Driving shaft
222 Swinging portion
311 Engaging piece of clamp
312 Pin
321 One end portion
322 Other end portion
323 Circular plate portion
324 Recessed portion
341 Turning center hole
342 Elongated hole
343 Engagement penetrating hole
344 Part of lock plate (operation portion)
345 Compression coil spring
346 Claw portion
347 Engaging piece of lock plate
351 Cam engaging portion
361 Cam surface
362 Lever engaging portion
363 Step portion
371 Upper portion of cylindrical portion
372 Bottom end portion of cylindrical portion
373 Bottom plate
381 Protruding portion of lock releasing lever
383 Turning center of lock releasing lever
391 Cam surface
2211 Eccentric portion
3111 Clamp claw portion
3112 Inner protruding portion
3113 Outer protruding portion
3611 Distal portion
3612 Proximal portion
3911 Distal portion
3912 Proximal portion
T Tip tool
T1 Tip edge portion
T2 Base end portion

The invention claimed is:

1. An electric tool, comprising:
a clamp configured to switch between a mounting state in which a tip tool is mounted and a releasing state in which the tip tool is removed;
a clamp moving portion configured to move between a first position at which the clamp is in the mounting state and a second position at which the clamp is in the releasing state;
a clamp urging portion configured to urge the clamp moving portion to the first position;
a case accommodating at least a part of each of the clamp, the clamp moving portion, and the clamp urging portion;
a retaining portion configured to retain the clamp moving portion at the second position; and
a mounting operation portion configured to receive mounting operation for switching the clamp from the releasing state to the mounting state, wherein
when the mounting operation portion receives the mounting operation, the retaining portion cancels retaining of the clamp moving portion at the second position.

2. The electric tool according to claim 1, wherein
the clamp moving portion includes a shaft portion that is connected to the clamp and moves between the first position and the second position, the retaining portion includes an engaging portion that moves to approach or separate from a shaft center of the shaft portion, and the shaft portion includes a recessed portion in a side surface, the recessed portion being engaged with the engaging portion when the clamp moving portion is at the second position.

3. The electric tool according to claim 1, wherein
the clamp moving portion includes a shaft portion that is connected to the clamp and moves between the first position and the second position,
the shaft portion includes one end portion and an other end portion, and the one end portion is connected to the clamp,
the retaining portion includes a cam,
the cam includes a cam surface configured to move the shaft portion by turning while abutting on the other end portion of the shaft portion,
the cam surface includes a distal portion far from the clamp and a proximal portion close to the clamp, and
the clamp moving portion is at the first position when the distal portion of the cam abuts on the other end portion of the shaft portion, and the clamp moving portion is at the second position when the proximal portion of the cam abuts on the other end portion of the shaft portion.

4. The electric tool according to claim 1, wherein
the clamp is positioned on a bottom surface side of the case, and
the mounting operation portion is positioned on a side surface side of the case.

5. The electric tool according to claim 1, further comprising
a releasing operation portion configured to receive releasing operation for switching the clamp from the mounting state to the releasing state, wherein
at least a part of the releasing operation portion is exposed from the case, and the clamp moving portion moves from the first position to the second position when releasing operation is received in a direction different from that in the mounting operation of the mounting operation portion.

6. The electric tool according to claim 5, wherein
when the releasing operation portion receives releasing operation of turning from a surface of the case, the clamp moving portion moves from the first position to the second position, and
the mounting operation portion moves in a direction of being pushed into the case along with the mounting operation.

\* \* \* \* \*